United States Patent
Sakaegi

(10) Patent No.: US 6,711,305 B2
(45) Date of Patent: *Mar. 23, 2004

(54) IMAGE PROCESSING APPARATUS AND METHOD

(75) Inventor: Yuji Sakaegi, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,718

(22) Filed: Mar. 9, 1999

(65) Prior Publication Data

US 2003/0012458 A1 Jan. 16, 2003

(30) Foreign Application Priority Data

Mar. 11, 1998 (JP) .......................... 10-059487

(51) Int. Cl.$^7$ .......................... G06K 9/32; H04N 11/20
(52) U.S. Cl. .......................... 382/300; 348/441
(58) Field of Search .......................... 382/300; 358/525, 358/428, 430; 348/431.1, 441, 455

(56) References Cited

U.S. PATENT DOCUMENTS

| 4,298,867 A | * 11/1981 | Craig |
| 5,459,519 A | * 10/1995 | Scalise et al. .............. 348/421 |
| 6,052,159 A | * 4/2000 | Ishii et al. |

FOREIGN PATENT DOCUMENTS

| EP | 0205554 | * 12/1990 | ............. H04N/7/01 |
| EP | 0626788 | * 11/1994 | ............. H04N/7/00 |
| JP | 8-18791 |   1/1996 | ............. H04N/1/41 |

* cited by examiner

Primary Examiner—Jerome Grant, II
(74) Attorney, Agent, or Firm—Fitzpatrick, Cella, Harper & Scinto

(57) ABSTRACT

Provided is an image processing apparatus and method. A memory is designed for use in converting input image data into data formatted in a sequence of scanning lines constituting a raster or data formatted in the sequence of blocks. The memory is utilized in order to produce interpolated image data during image reproducing. This allows for the number of memories devices to be decreased, while improving the reproducibility of image data.

9 Claims, 3 Drawing Sheets

IMAGE PROCESSING APPARATUS AND METHOD

BACKGROUND OF THE INVENTION

1. Field of the Invention

The present invention relates to an image processing apparatus and method for decoding coded image data.

2. Description of the Related Art

FIG. 1 is a block diagram showing a conventional image decoding apparatus for decoding image data that has been compressed and coded.

In FIG. 1, a CPU 2 reads image data that has been compressed and coded using, for example the Joint Photographic Coding Experts Group (JPEG) method and recorded on a flash memory card 1. The image data is temporarily stored in a memory 3. The coded data stored in the memory 3 is decoded by a JPEG decoding circuit 4. At this time, the decoded image data is output from the JPEG decoding circuit 4 in units of a block composed of 64 pixels arranged in a matrix of 8 pixels in a row by 8 pixels in a column. Each pixel represents a luminance level (hereinafter Y) and chrominance levels (hereinafter U and V).

Block data of each color component (Y, U, or V) output from the JPEG decoding circuit 4 is converted into Y, U, or V data, by a raster block conversion circuit 5. The Y, U, or V data is formatted suitably for raster scan.

The converted image data is held in a first-in first-out (FIFO) VRAM 6 which holds an amount needed to render one screen. The FIFO VRAM 6 outputs input information data in FIFO sequence. In the case of inputting data formatted in the sequence of scanning lines constituting a raster, inputting is repeated in that sequence. The formatting is therefore suitable for outputting data to an LCD, TV, or the like. Moreover, a sync signal generator (SSG) 13 in FIG. 1 generates a timing signal such as a sync signal employed in television.

The FIFO VRAM 6 outputs image data synchronously with the television sync signal generated by the SSG 13. When image data rendering a first field is output from the FIFO VRAM 6, a selection switch 9 is connected to a terminal "b". The image data is sent to an encoder 10 as it is.

The encoder 10 modulates in amplitude the U and V data items according to a sub carrier, and adds the data items to the Y data. The encoder 10 then adds the sync signal to the resultant data. The image data encoded by the encoder 10 is converted into an analog image signal by a D/A converter 11. An image is then displayed on a display device 12 such as an LCD or CRT according to the image data.

Next, when image data rendering a second field is output from the FIFO VRAM 6, the selection switch 9 is connected to a terminal "a". A signal output from the FIFO VRAM 6 in response to a signal FI, and a signal produced by delaying the output signal by 1H (a horizontal scanning period) by a delay circuit 7 are averaged by an averaging circuit 8. A resultant signal is then output to the encoder 10.

Assume that the foregoing image decoding apparatus attempts to decode image data arranged in a matrix of 640 pixels in a row and 480 pixels in a column. Image data formatted in units of a block and decoded by the JPEG decoding circuit 4 is converted into data formatted suitably for raster scan. At this time, a storage capacity of a product of 640 pixels by 8 lines is necessary. Moreover, two memories having the storage capacity of a product of 640 pixels by 8 lines are prepared for pipelining the conversion. Thus, writing and reading are generally carried out simultaneously.

The FIFO VRAM 6 is expensive. The FIFO VRAM 6 is therefore often designed to offer a storage capacity permitting accumulation of data representing a product of 640 by 240 dots. In this case, as mentioned above, the switch 9 must be designed to be able to be changed over to the delay circuit 7 or averaging circuit 7 field by field. In this case, interlacing must be adopted.

If the FIFO VRAM 6 were designed to offer a storage capacity equivalent to a product of 640 by 480 dots, the delay circuit 7 would be unnecessary. However, this poses a problem in that the FIFO VRAM 6 becomes more expensive along with the increase in capacity.

Moreover, if the FIFO VRAM 6 were designed to offer a storage capacity equivalent to a product of 640 by 240 dots, and the delay circuit 7 were excluded, a TV image would swing lengthwise.

SUMMARY OF THE INVENTION

In consideration of the aforesaid background, one object of the present invention is to provide an image processing apparatus and method in which the number of memories is decreased to accomplish a reduction in cost without deterioration of image reproducibility.

Accordingly, in one preferred embodiment, an image processing apparatus and method are characterized in that image data is input in units of a block composed of a plurality of pixels. The input image data is stored in a memory; access addresses used to access the memory are controlled to convert the image data into image data formatted in the sequence of scanning lines constituting a raster. Interpolated image data is produced using the converted image data, which has been delayed in the memory used for the conversion, and the converted image data that has not been delayed.

Moreover, in one preferred embodiment, an image processing apparatus and method are characterized in that: image data is input in the sequence of scanning lines constituting a raster. The input image data is stored in a memory and access addresses used to access the memory are controlled to convert the image data into image data formatted in the sequence of blocks. Interpolated image data is produced using the image data that has been delayed in the memory used for conversion, and the image data that has not been delayed.

Other objects, features and advantages of the invention will become apparent from the following detailed description taken into conjunction with the accompanying drawings.

DESCRIPTION OF THE PREFERRED EMBODIMENTS

First Embodiment

Figure 1:
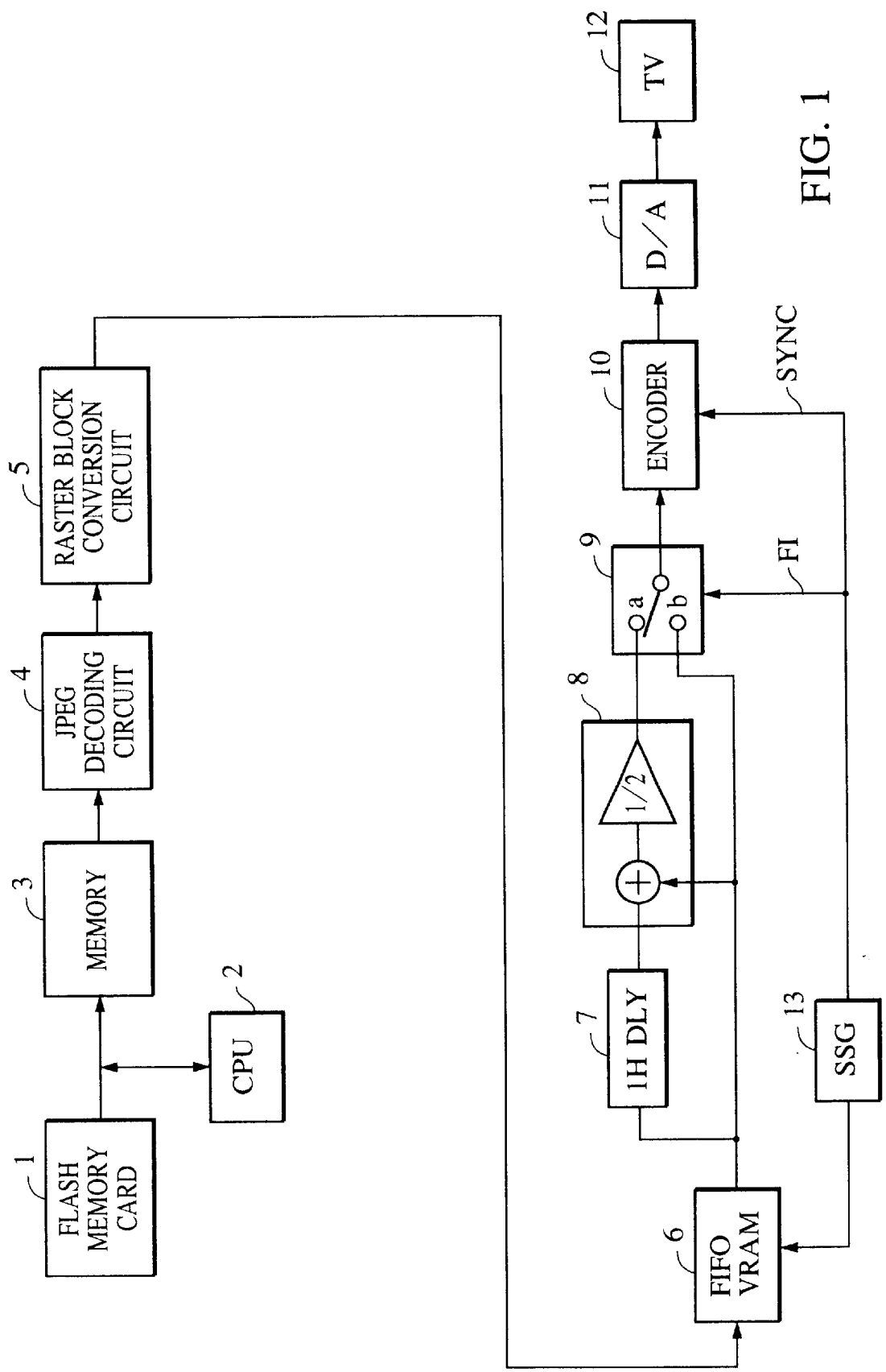
FIG. 1 is a block diagram showing the configuration of a conventional image decoding apparatus.

Referring to the drawings, preferred embodiments of the present invention will be described below.

Figure 2:
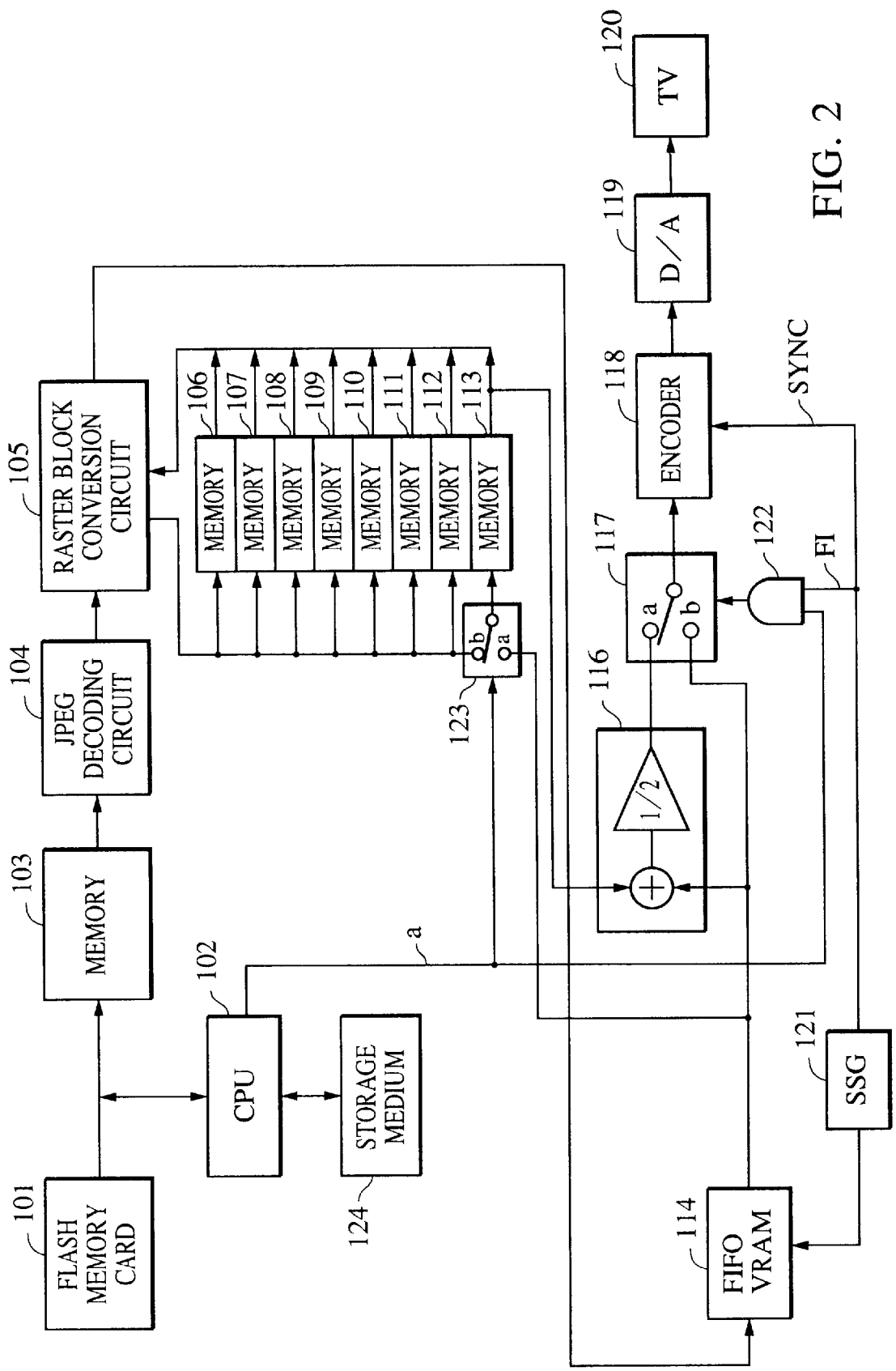
FIG. 2 is a block diagram showing the configuration of an image decoding apparatus of an embodiment in accordance with the present invention.

FIG. 2 is a block diagram showing the configuration of an image decoding apparatus of an embodiment in accordance with the present invention.

In FIG. 2, a CPU 102 reads image data, which has been compressed and coded using for example the Joint Photographic Coding Experts Group (JPEG) method, recorded on a flash memory card 101. The image data is temporarily stored in a memory 103. The coded data stored in the memory 103 is decoded by a JPEG decoding circuit 104. At this time, the decoded image data is output from the JPEG decoding circuit 104 in units of a block composed of 64 pixels arranged in a matrix of 8 pixels in a row by 8 pixels in a column. Each pixel represents a luminance level (hereinafter Y) and chrominance levels (hereinafter U and V).

Block data output from the JPEG decoding circuit 104 is converted into Y, U, and V data items, which are formatted suitably for raster scan, by a raster block conversion control circuit 105.

The raster block conversion control circuit 105 of this embodiment uses memories 106 to 113 to produce the Y, U, and V data items formatted suitably for raster scan. The memories offer a storage capacity of one horizontal line individually, and a storage capacity of eight lines as a whole. In other words, the raster block conversion control circuit 105 uses the memories 106 to 113 to convert the image data items representing color components (Y, U, and V) into image data items formatted in the sequence of scanning lines constituting a raster. The image data items representing color components have been input in the sequence of blocks. Moreover, the memories 106 to 113 are banks of a single memory, and each offers a storage capacity equivalent to one line. For converting image data into image data formatted in the sequence of scanning lines constituting a raster, "0" is output as a signal "a" from the CPU 102. In response to the signal, a switch 123 is connected to a terminal "b". The image data output from the raster block conversion control circuit 105 is supplied to the memory 113.

Now, a description will be made of conversion for converting image data, which is input in the sequence of blocks, into image data formatted in the sequence of scanning lines constituting a raster.

Conversion for converting image data, which is formatted in the sequence of n×m-sized blocks, into image data formatted in the sequence of scanning lines constituting a raster will be described briefly.

To begin with, a single memory is needed to store data in units of n lines. The memory is segmented into areas associated with groups of pixels numbering a product of n by k. Each group of pixels includes m pixels constituting one line. Addresses determining the sequence of writing or reading image data are defined for the groups of pixels numbering the product of n by k. According to the addresses, writing or reading of image data is performed on the groups of pixels. Thus, the image data formatted in the sequence of n×m-sized blocks each having pixels arranged in the matrix of n by m is converted into image data formatted in the sequence of scanning lines constituting a raster.

In this embodiment, each block has pixels arranged in the matrix of 8 by 8 (the size of a block need not be limited to 8×8). In this case n equals to 8 and m equals to 8. The number of pixels constituting image data to be visualized during 1H (a horizontal scanning period) is, as mentioned later, 640 according to this embodiment. Therefore, k equals to 640/8=80. In other words, the single memory is divided into areas associated with 8×80=640 groups of pixels.

Incidentally, Japanese Unexamined Patent Publication No. 8-18791 filed by the present inventor describes raster-to-block conversion similar to that in the present invention. For details of the conversion, refer to the patent publication.

Image data converted suitably for raster scan by means of the raster block conversion control circuit 105 and the memories 106 to 113 is held by an amount needed to render one screen. At this time, the image data is held in a FIFO VRAM 114 having a storage capacity equivalent to one field. The FIFO VRAM outputs input information data in first-in first-out (FIFO) sequence. For inputting data formatted in the sequence of scanning lines constituting a raster, inputting is repeated in that sequence. The formatting is therefore suitable for outputting of data to an LCD or TV. Herein, the FIFO VRAM 114 is realized with a FIFO VRAM offering a storage capacity equivalent merely to 640 by 240 dots. This is intended to reduce costs.

Moreover, a sync signal generator (SSG) 121 in FIG. 2 generates a timing signal such as a sync signal employed in television.

The FIFO VRAM 114 outputs image data synchronously with the television sync signal generated by the SSG 121. When image data rendering a first field is output from the FIFO VRAM 114, the selection switch 117 is connected to the terminal "b". The image data is therefore sent to the encoder 118 as it is.

The encoder 118 modulates in amplitude U and V data items according to a sub carrier, and adds the data items to Y data. The encoder 118 then adds the sync signal to the resultant data. The image data encoded by the encoder 118 is converted into an analog image signal by a D/A converter 119. Consequently, an image is displayed on a display device 120 such as an LCD or CRT according to the image data.

When the JPEG decoding circuit 104 is operating, the CPU 102 outputs "0" as the signal "a". An output of an AND gate 122 is therefore 0. The switch 117 is then connected to the terminal "b".

When decoding is completed for one image data item according to the JPEG, the CPU 102 outputs "1" as the signal "a". The switch 123 is then connected to the terminal "a". Image data output from the FIFO VRAM 114 is supplied to the memory 113 via the switch 123. The memory 113 operates as a 1H delay line for holding signals that have been sent from the FIFO VRAM 114 and are to be scanned during 1H.

At this time, the SSG 121 outputs a signal FI (field index) that represents 1 or 0 field by field, and supplies it to the AND gate 122. The switch 117 therefore switches fields at the start of each field period. One of the fields is a field that is rendered by directly outputting a signal from the FIFO VRAM 114. The other field is a field that is rendered by outputting a signal that represents an arithmetic mean of a signal lagging by 1H behind a signal representing the field.

According to this embodiment, when data is decompressed according to the JPEG, the memory designed for raster-to-block conversion is used for the raster-to-block conversion. After decoding data according to the JPEG is completed, the memory designed for raster-to-block conversion is used to delay a television signal. Unlike the conventional apparatus, a dedicated delay line is unused, but lengthwise swinging of an image on a TV screen can be resolved.

Second Embodiment

Figure 3:
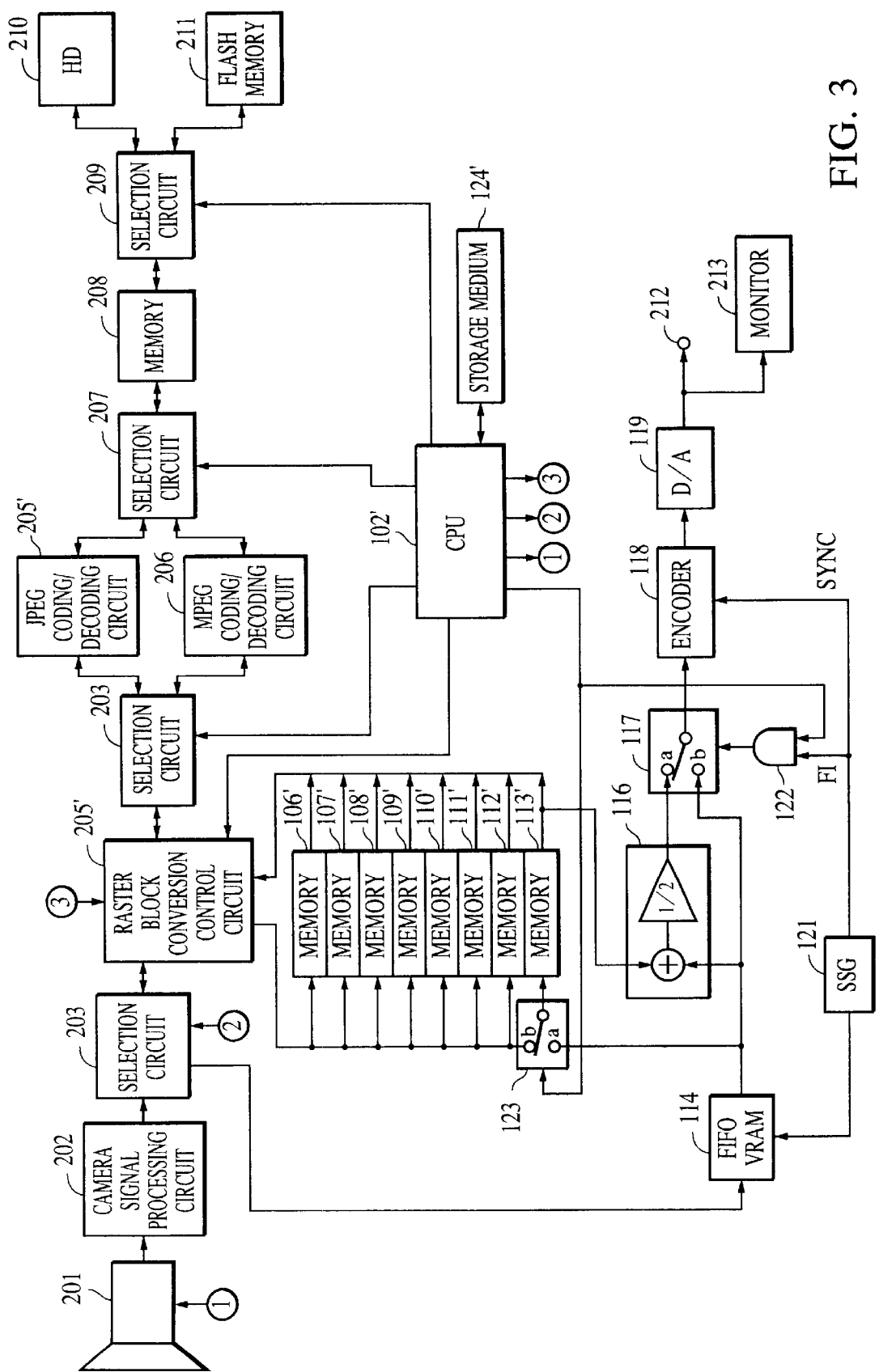
FIG. 3 is a block diagram showing the configuration of a digital camera of an embodiment in accordance with the present invention.

FIG. 3 is a block diagram showing the configuration of a digital camera of a second embodiment in accordance with the present invention. The same reference numerals will be assigned to components identical to those in FIG. 2. The details of those components will be omitted.

To begin with, a description will be made of an operation of recording a still image.

Still image data produced by a camera 201 controlled by a CPU 102' is converted into digital data by a camera signal processing circuit 202. Predetermined image processing, for example, edge enhancement and conversion to Y, U, and V data items are then performed on the digital data.

Image data processed by the camera signal processing circuit 202 is supplied to a raster block conversion control circuit 105' via a selection circuit 203 controlled by the CPU 102'.

A raster block conversion control circuit 105' in this embodiment uses, like the one in the first embodiment, memories 106' to 113' to convert Y, U, and V data items into 8×8-sized block data items representing color components. The Y, U, and V data items have been formatted in the sequence of scanning lines constituting a raster. The memories 106' to 113' offer a storage capacity of one horizontal line individually, and a storage capacity of eight lines as a whole. In other words, the raster block conversion control circuit 105' uses the memories 106' to 113' to convert image data, which has been input in the sequence of scanning lines constituting a raster, into image data formatted in the sequence of blocks during image recording. The memories 106' to 113' are banks of a single memory.

The CPU 102' outputs "0" as a signal "a". With the signal, the switch 123 is connected to the terminal "b". The image data output from the raster block conversion control circuit 105' is then supplied to the memory 113'.

Conversion for converting image data, which has been input in the sequence of scanning lines constituting a raster, to image data formatted in the sequence of blocks is carried out merely by reversing the conversion implemented in the first embodiment. Specifically, conversion in this embodiment is carried out merely by reversing the operation of converting image data formatted in the sequence of blocks into image data formatted in the sequence of scanning lines constituting a raster. For the details, refer to Japanese Unexamined Patent Publication No. 8-18791 filed by the present invention.

Image data converted into 8×8-sized block data by the raster block conversion control circuit 105' is supplied to a JPEG coding/decoding circuit 205 via a selection circuit 204 controlled by the CPU 102'.

The JPEG coding/decoding circuit 205 compresses and codes the image data of 8×8-sized blocks according to the JPEG method. The coded image data output from the JPEG coding/decoding circuit 205 is stored in a flash memory 211 via a selection circuit 207, a memory 208 working as a buffer, and a selection circuit 209.

The selection circuits 207 and 209 are controlled by the CPU 102'. Moreover, the flash memory 211 can be freely dismounted from the apparatus so that it can be replaced with another.

Next, an operation of recording a moving picture will be described below.

Moving picture data produced by the camera 201 controlled by the CPU 102' is, like still image data, subjected to predetermined signal processing by means of the camera signal processing circuit 202. The moving picture data is then supplied to the raster block conversion control circuit 105' via the selection circuit 203, and duly converted into 8×8-sized block data.

The image data converted into 8×8-sized block data by the raster block conversion control circuit 105' is supplied to the MPEG coding/decoding circuit 206 via the selection circuit 204 controlled by the CPU 102'. Coding is then executed according to a Moving Picture Coding Experts Group (MPEG) method (for example, MPEG-1, MPEG-2, or MPEG-4). The coded image data is stored in a hard disk (HD) 210, of which storage capacity is much larger than that of the flash memory 211, via the selection circuit 207, memory 208, and selection circuit 209.

Incidentally, the HD 210 can freely be dismounted from the apparatus so that it can be replaced with another.

Next, an operation of reproducing still image data recorded in the flash memory 211 will be described below.

Image data read from the flash memory 211 and coded conformably to the JPEG method is supplied to the JPEG coding/decoding circuit 205 via the selection circuit 209, memory 208, and selection circuit 207.

The JPEG coding/decoding circuit 205 decodes image data coded conformably to the JPEG method. The JPEG coding/decoding circuit 205 then outputs image data of 8×8-sized blocks, which are unit blocks used for coding, to the raster block conversion control circuit 105' via the selection circuit 204.

The raster block conversion control circuit 105' carries out processing identical to that implemented in the first embodiment. That is to say, the raster block conversion control circuit 105' converts image data, which has been formatted in the sequence of blocks, into image data formatted in the sequence of scanning lines constituting a raster. The image data is output to the FIFO VRAM 114 via the selection circuit 203. Processing involving the components ranging from the FIFO VRAM 114 to the D/A converter 119 is identical to that implemented in the first embodiment. The description of the processing will be omitted. In this embodiment, a television signal output from the D/A converter 119 is output through an output terminal 212. An image may be displayed on a monitor 213 included in the apparatus (for example, an LCD) using the television signal.

Next, an operation of reproducing moving picture data stored in the HD 210 will be described below.

Image data read from the HD 210 and coded conformably to an MPEG method is supplied to an MPEG coding/decoding circuit 206 via the selection circuit 209, memory 208, and selection circuit 207.

The MPEG coding/decoding circuit 206 decodes the image data coded conformably to the MPEG method. The MPEG coding/decoding circuit 206 then outputs image data of 8×8-sized blocks, which are unit blocks used for coding, to the raster block conversion control circuit 105' via the selection circuit 204.

The raster block conversion control circuit 105' carries out processing identical to that implemented in the first embodiment. Image data formatted in the sequence of blocks is converted into image data formatted in the sequence of scanning lines constituting a raster. The image data is output to the FIFO VRAM 114 via the selection circuit 203. Processing involving the components ranging from the FIFO VRAM 114 to the D/A converter 119 is identical to that implemented in the first embodiment. The description of the processing will be omitted. In this embodiment, a television signal output from the D/A converter 119 is output through the output terminal 212. An image may be displayed on the monitor 213 included in the apparatus (for example, an LCD) using the signal.

As mentioned above, according to the second embodiment, when coding or decoding is carried out conformably to the JPEG or MPEG, the memory designed for raster-to-block conversion is used for raster-to-block conversion (conversion from raster data to block data or vice versa). After the JPEG or MPEG-conformable coding or decoding is completed, that is, when the memory designed for raster-to-block conversion is not used for raster-to-block conversion, the memory designed for raster-to-block conversion is used to delay a television signal. Thus, lengthwise swinging of an image on a TV screen can be resolved. In short, it becomes unnecessary to include a dedicated delay line that has been used to resolve the lengthwise swinging of an image in the past.

Incidentally, image data produced by the camera 201 may be output to the FIFO VRAM 114 via the selection circuit 203 in order to display an image on the monitor 213.

However, when image data is stored in the HD 210 or flash memory 211 while used to display an image on the monitor 213, the memories 106' to 113' are used for raster-to-block conversion. It is impossible to prevent lengthwise swinging of an image using the memory 113'. As mentioned previously, as long as image data is not recorded while used to display an image, the memory 113' is used as a delay line for preventing lengthwise swinging of an image.

Moreover, according to the aforesaid embodiments, a still image coded conformably to the JPEG is recorded in the flash memory 211, and moving picture data coded conformably to the MPEG is recorded in the HD 210. Alternatively, users may be allowed to select one of the storage media. Specifically, moving picture data may be recorded in the flash memory 211, and still image data may be recorded in the HD 210.

In the aforesaid embodiments, still image data is coded conformably to the JPEG, and moving image data is coded conformably to the MPEG. However, the present invention is not limited to this mode.

Other Embodiments

The present invention may be adapted to a system composed of a plurality of pieces of equipment, for example, a host computer, interface equipment, a reader, and a printer. Otherwise, the present invention may be adapted to an apparatus realized with one piece of equipment, for example, a digital VTR, a digital camera, and a digital TV.

Moreover, an apparatus or system connected to various types of devices so that the devices can be operated in order to realize the constituent features of the aforesaid embodiments is also included in the scope of the present invention. The apparatus or system includes a computer to which a program code of software for realizing the constituent features of the embodiments is supplied. The various devices are operated by running programs residing in the computer (CPU or MPU) in the system or apparatus.

In this case, the program code of software itself can be considered to realize the constituent features of the aforesaid embodiments. The program code itself, and a means used to supply the program code to the computer, for example, a storage medium in which the program code is stored constitute the present invention.

The storage medium in which the program code is stored may be, for example, a floppy disk, a hard disk, an optical disk, a magneto-optical disk, a CD-ROM, a magnetic tape, a nonvolatile memory card, or a ROM.

Moreover, when the computer executes the supplied program code, the constituent features of the embodiments are realized. In addition, the program code may realize the constituent features of the aforesaid embodiments in cooperation with an operating system (OS) running in the computer or with another application software. Even this form is, needless to say, included in the embodiments of the present invention.

Furthermore, the supplied program code may be stored in a memory incorporated in a function extension board of the computer or a function extension unit connected to the computer. Thereafter, based on instructions given according to the program code, a CPU or the like mounted on the function extension board or function extension unit may execute part or the whole of actual processing. The execution of the processing may realize the constituent features of the embodiments. Even this form is, needless to say, included in the present invention.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:

input means for inputting image data in units of a block composed of a plurality of pixels, wherein the image data input by said input means is image data coded in units of a block, and said input means includes decoding means for decoding the coded image data, converting means for storing the input image data in a memory, controlling access addresses used to access said memory, and then converting the input image data into image data formatted in a sequence of scanning lines constituting a raster;

storing means for storing the converted image data converted by said converting means; and producing means for producing interpolated image data using image data output from said storing means and delayed image data that has been output from said storing means and which has been delayed by using said memory.

2. An apparatus according to claim 1, wherein said input means includes imaging means for producing an image and outputting image data, and said converting means converts image data, which has been formatted in the sequence of scanning lines constituting a raster and output from said imaging means, into image data formatted in the sequence of blocks.

3. An apparatus according to claim 2, further comprising coding means for coding image data, which has been produced by said imaging means, in units of blocks.

4. An apparatus according to claim 1, wherein said producing means includes averaging means for averaging the delayed image data and the image data output by said memory, and output means for selectively outputting the averaged image data and the image data output by said memory during each field period.

5. An apparatus according to claim 1, wherein said input means selectively inputs still image data and moving picture data as coded image data.

6. An apparatus according to claim 4, wherein the still image data and moving picture image are coded conformably to mutually different compression coding methods.

7. An apparatus according to claim 1, wherein the image data input by said input means has been coded conformably to a JPEG method.

8. An apparatus according to claim 1, wherein the image data input by said input means has been coded conformably to an MPEG method.

9. An image processing method comprising the steps of:

inputting image data in units of a block composed of a plurality of pixels, wherein the input image data is image data coded in units of a block;

decoding the coded input image data;

storing the decoded image data in a first memory;

converting the decoded image data into image data formatted in a sequence of scanning lines constituting a raster by controlling access addresses used to access the first memory;

storing the converted image data in a second memory; and producing interpolated image data using image data output from said second memory and delayed image data that has been output from said second memory and which has been delayed by using said first memory.

* * * * *

UNITED STATES PATENT AND TRADEMARK OFFICE
CERTIFICATE OF CORRECTION

PATENT NO. : 6,711,305 B2
DATED : March 23, 2004
INVENTOR(S) : Sakaegi

It is certified that error appears in the above-identified patent and that said Letters Patent is hereby corrected as shown below:

<u>Drawings,</u>
Sheet 3, Fig. 3, reference numeral "205'" on the block reading "RASTER BLOCK CONVERSION CONTROL CIRCUIT" should read as reference numeral -- 105' --; reference numeral "203" on the block reading "SELECTION CIRCUIT" should read as reference numeral -- 204 --; and
reference numeral "205'" on the block reading "JPEG CODING/DECODING CIRCUIT" should read as reference numeral -- 205 --

<u>Column 8,</u>
Line 32, "data," should read -- data; --.

Signed and Sealed this

Fourth Day of January, 2005

JON W. DUDAS
*Director of the United States Patent and Trademark Office*